(12) United States Patent
Elze et al.

(10) Patent No.: US 6,527,488 B2
(45) Date of Patent: Mar. 4, 2003

(54) DUNNAGE BAG HAVING A MESH PLY

(76) Inventors: Helmut Elze, 827 Grosvenor Pl., Oakland, CA (US) 94610; Olaf Dietrich Elze, 284 La Quinta Ct., Walnut Creek, CA (US) 94598; Mark Joseph Caires, 2560 Downing Ave., San Jose, CA (US) 95128

( * ) Notice: Subject to any disclaimer, the term of this patent is extended or adjusted under 35 U.S.C. 154(b) by 0 days.

(21) Appl. No.: 09/815,096

(22) Filed: Mar. 21, 2001

(65) Prior Publication Data

US 2002/0136614 A1 Sep. 26, 2002

(51) Int. Cl.⁷ .................................................. B06P 7/16
(52) U.S. Cl. ...................................... 410/119; 410/125
(58) Field of Search ................................ 410/117, 118, 410/119, 125, 155; 206/522; 383/25, 109, 113; 428/35.2

(56) References Cited

U.S. PATENT DOCUMENTS

| | | | | |
|---|---|---|---|---|
| 3,072,270 A | * | 1/1963 | Tolby et al. | 410/119 |
| 3,199,689 A | * | 8/1965 | Feldkamp | 410/119 |
| 3,426,891 A | * | 2/1969 | Marks | 410/119 |
| 3,462,027 A | * | 8/1969 | Puckhaber | 410/119 |
| 3,762,580 A | * | 10/1973 | Melsek | 410/119 |
| 4,044,693 A | * | 8/1977 | Ramsey, Jr. | 410/119 |
| 5,678,969 A | * | 10/1997 | Farrell et al. | 410/119 |
| 5,868,534 A | * | 2/1999 | Goshorn et al. | 410/119 |

FOREIGN PATENT DOCUMENTS

| | | | | |
|---|---|---|---|---|
| CA | 956513 | * | 3/1974 | 410/119 |
| GB | 2267466 | * | 12/1993 | 410/119 |

* cited by examiner

Primary Examiner—Stephen T. Gordon
(74) Attorney, Agent, or Firm—Robert Samuel Smith

(57) ABSTRACT

A principal advantage of this composite bag compared to the bags disclosed in the present art using solid ply is improved combination of strength and flexibility. A composite dunnage bag being an elastic inner bag enclosed in a mesh outer bag. The bag replaces the system of state of the art bags plus filler panels which are currently used when the space between pallets is greater than 12 inches. The combination mesh and plastic is sufficiently strong and flexible to permit the bag to apply an 80% footprint against the cargo walls.

5 Claims, 1 Drawing Sheet

DUNNAGE BAG HAVING A MESH PLY

FIELD OF THE INVENTION

This invention relates to dunnage bag and particularly to a composite bag having an inner bladder and and outer mesh.

BACKGROUND AND INFORMATION DISCLOSURE

Products are commonly shipped as stacks of cargo on pallets placed in the cargo space of an enclosure such as a truck trailer or container. After placing the cargo in the cargo space, it is generally necessary to support the cargo in the cargo space to prevent damage due to shifting Common practice is to position two rows of cargo on pallets, each row extending from the front to the rear of the container. The space between the rows should contain braces to prevent shifting as described above.

"Dunnage bags", large inflatable bags made of paper with an air tight plastic liner, have been used to prevent the shifting of cargo during transportation. These bags are placed in the space between the cargo and the walls of the container or between neighboring rows of pallets holding cargo and then inflated. The bags are typically inflated to a pressure of not more than 1½ to 2 pounds per square inch (psi). When the cargo arrives at its destination and prior to unloading, the bags are punctured and discarded.

The problem of damage to cargo during transport has such a commonality and severity that the American Association of Rail Roads has adopted standardized requirements for an acceptable protection system.

These requirements for dunnage bags include an "80% footprint": where a footprint is the area of contact of the interface between the wall of the cargo and the bag. This specification satisfies the two requirements that the interface of the bag exert sufficient force over a broad area of the bag to support the product without crushing the cargo such as when the cargo might be bags of fruit.

The A.A.R.R. has also developed a uniform testing procedure that any shipping system must pass in order that the participating company receive the required approval from that Association to apply that system as a basis for its shipping procedure.

The test, referred to herein as the AARR test, incorporated by reference into this specification, is described as follows:

1. A first railcar, loaded with 45,000 pounds, is positioned on a railroad track.
2. Additional railcars having a total weight of 275,000 pounds are accelerated to a speed of 3 miles per hour and caused to slam into the first car.
3. This procedure is repeated a total of 3 times at speeds of 6 miles per hour each time.
4. The spacers are examined to determine any damage that has occurred to the spacers such as rupture of dunnage bags, etc. The amount of movement is measured to determine the effectiveness of the air bags.

Various embodiments of dunnage bags have been disclosed for addressing requirements of dunnage bags.

U.S. Pat. No. 3,427,995 to Stafford discloses an inflatable dunnage bag system positioned between cargo and the end bulkheads of railroad cars. This disclosure does not address the problem of filling space between rows of pallets parallel to the track.

U.S. Pat. No. 4,136,788 discloses a dunnage bag made of layers of paper with flaps extending from the ends of the ply joined to the other wall. This invention suitable only where large overall thickness is required for extra protection. and the "pinched end of the bag results in diminished contact (footprint) can be tolerated.

U.S. Pat. No. 4,553,887 to Reeves discloses a dunnage bag made of triangular sheets of kraft paper lined with polyethylene.

U.S. Pat. No. 4,591,519 to Liebel discloses an airbag for bracing made of a stiff paperboard having good vertical stiffness when uninflated.

U.S. Pat. No. 5,042,663 to Heinrick discloses joinable inflatable bladders for packaging.

U.S. Pat. No. 5,288,188 to Vanes discloses a dunnage bag constructed of welded rectangular sheets.

U.S. Pat. No. 5,372,396 to Nahmen discloses a cargo bed liner with side panels pivotally attached.

U.S. Pat. No. 5,431,525 to Sansone et al discloses a dual air bladder air bag.

U.S. Pat. No. 5,693,163 to Hoover et al discloses a method for making inflated dunnage bags "on site" including unrolling a folded sheet and sealing step.

U.S. Pat. Nos. 5,868,534 and 5,788,438 to Boshorn et al discloses a sealed bag inserted into a paper tube.

U.S. Pat. No. 5,908,275 to Howlett discloses an inflatable bag comprising an inflatable inner bladder surrounded by a pair of paper plies.

None of the systems dunnage bags (inflated to 3 psi disclosed in the prior art perform satisfactorily when subject to the test sanctioned by the AARR when the space between the parallel pallets is greater than 12 inches. This is because, of a number of reasons including swelling of the bag toward the ceiling and because, when the space is greater than 12 inches, an attempt to inflate the bag up to the 3 psi limit results in the bag not having enough surface area coverage and therefore not exerting enough force on the product.

Accordingly, the present practice for filling spaces having widths greater than twelve inches, is to occupy the additional space with "fillers". Sheets of "honey comb" panel are commonly used for such purposes. However, the use of filler panels presents a number of inconveniences including storage of the panel when not in use and the inconvenience associated with installing and removing the filler panels when loading and unloading the cargo space and extremely high cost of the fillers.

Rigid collapsible braces have been disclosed for supporting cargo in cargo space. For example, U.S. Pat. No. 4,236,854 discloses a brace having side rails and extensible side arms U.S. Pat. No. 4,473,31 to Wisecarver discloses a foot assembly and extensible element with lever locking member.

U.S. Pat. No. 5,181,815 to Haberkorn discloses a collapsible bracing structure and rotatable latches for releasing.

U.S. Pat. No. 3,665,638 to James discloses a load brace with selectable fixed positions.

In view of the above, there continues to be intense interest in improving the dunnage bags and systems presently on the market and disclosed above in terms of reducing expense and inconvenience for filling space between rows of pallets with product where the vertical walls of cargo are spaced by more than twelve inches.

SUMMARY OF THE INVENTION

It is an object of this invention to provide a dunnage bag for filling spaces between a pallet loaded with cargo and a neighboring pallet loaded with cargo.

It is a further object to provide a bag that protects cargo on pallets during transit when the the space between rows of cargo on pallets is greater than 12 inches without the use of additional void fillers. In this situation, it is also an object that the bag surpasses the requirement of the A.A. R. R. rest for dunnage systems that protect cargo on pallets for transit These requirements include developing a footprint of at least 80% when the bags are inflated to 1–3 pounds per square inch pressure.

This invention is directed toward a composite bag comprising an inflatable bag enclosed inside an outer mesh bag. The inner bag comprises polypropylene sheet material about 0.10 mm thick especially formulated to have enhanced elasticity. The mesh comprises woven polypropylene. In use, the bag is positioned in the space between a pair of pallets, each loaded with cargo. The inner bag is inflated to fill the space and support the bag during transit.

The inner polyethylene sheet material is sufficiently thin and flexible to enable the inner bag to stretch without rupturing to the limit imposed by the mesh and contact 80% of the vertical cargo surface.

In a typical situation, the composite bag is inflated to 1½ psi. The area of the double bag facing the ceiling of the container is contained by the mesh so that bulging toward the ceiling of the container is minimal.

For spaces between stacks of cargo that are greater than 12 inches, use of the composite bag of this invention in place of the "standard" bag together with filler panels provides greater convenience and reduced cost for preventing shifting of cargo during transportation.

Each bag typically has an inlet valve adapted for admitting air into the bag from a pneumatic pump and a separate nipple with a cap wherein the nipple is large enough such that, when the cap is removed, the air is expelled very quickly allowing quick and convenient deflation of the bag prior to unloading the cargo.

The method and features of this invention, and other aspects and advantages will become better understood after studying the following description, appended claims, and accompanying drawings.

DESCRIPTION OF PREFERRED EMBODIMENTS

Figure 1:
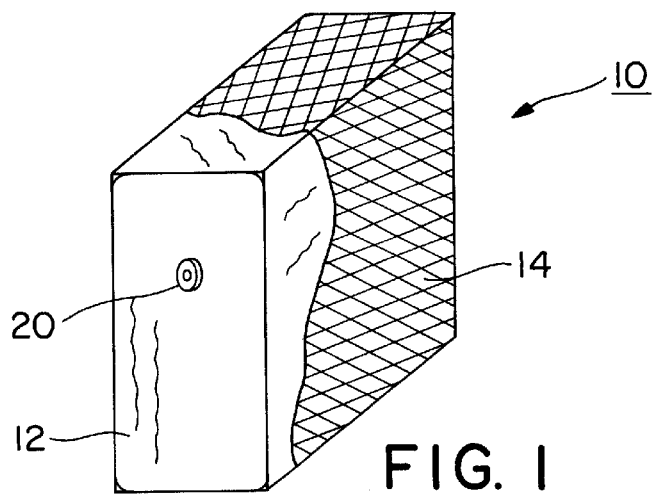
FIG. 1. is a perspective view showing the composite structure of the bag.

Turning now to a discussion of the drawings, FIG. 1 shows the composite dunnage bag 10 of this invention including an inner inflatable bag 12 and an outer mesh 14 enclosing the inner bag. The mesh 14 is partially cut away to show the inner bag 12.

FIG. 1 shows the valve means for inflating and deflating the inner bag including a valve with a cap 20 on the side of the bag 10. which is attached to a source of pressurized air for filling the bag. The cap is removed for fast deflating the bag 10 when the cargo is unloaded.

Nipples and valves are well known in the art and any one may be used in this application.

The inner bag 12 comprises an extruded high density polyethylene tube with vinyl acetate modification. Each end of the tube is heat sealed. The vinyl acetate modification increases elasticity of the inner bag. The tube has a wall 0.1 millimeters thick.

High density polyethylene sheet modified with vinyl acetate is available from the Dupont Co.

Figure 2:
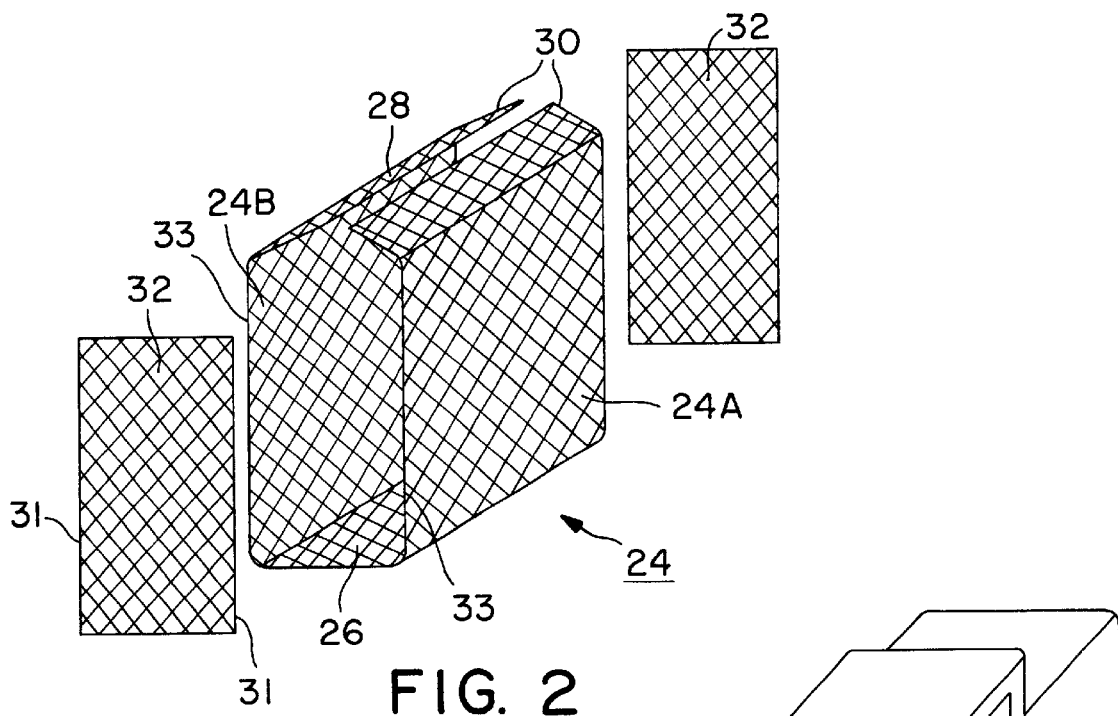
FIG. 2 is an exploded view of the outer mesh bag.

The outer bag comprises woven polypropylene thread about 0.5 millimeters thick with about twelve threads per inch of weave FIG. 2 shows the outer mesh bag exploded to show details of the construction. There is shown a single mesh panel 24 folded to form two broad sections 24 A, B, a bottom section 26 and a top section 28. The two meeting edges 30 are stitched together to form a mesh tube.

A pair of rectangular end mesh panels 32 are shown. Each end mesh panel 32 has one edge 31 stitched to an end edge 33 of the mesh tube and an opposite edge stitched to an opposite end edge of the mesh tube. The outer mesh bag is thereby formed having a substantially mattress shape when positioned in the space between the rows of cargo and the inner bag is filled with pressurized air.

Figure 3:
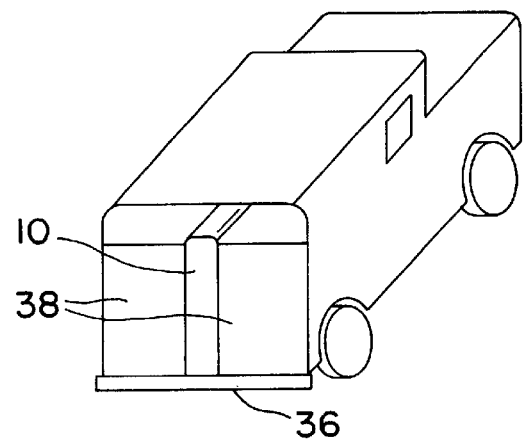
FIG. 3 shows a truckbed with the dunnage bag between two rows of cargo.

FIG. 3 shows a truckbed 36 with two parallel rows 38 of loaded pallets and a dunnage bag 10 of the invention positioned between the rows 38. The present invention is specifically designed to accommodate a space selected from a range between 12 to 22 inches between the rows of cargo.

The dunnage bag of FIG. 2 is especially designed to fill a space between rows of cargo in a range of 12 to 22 inches when the mattress shape has a width of about 20 inches. The height is typically selected from a range between 30 and 48 inches. The length selected from a range between 48 and 102 inches.

There has been described a dunnage bag and method for use to achieve the objects of the invention.

A principal advantage of this composite bag compared to the bags disclosed in the present art using solid ply is improved combination of strength and flexibility.

A mesh inherently has greater tear resistance and resistance to puncture than does a solid sheet of the same weight.

The combination mesh container enclosing an inflatable bag has an improved ability to be inflated to where the composite bag fills in the irregular volume between rows of stacked products.

Variations and modifications may be suggested by reading the specification and studying the figs. that are within the scope of the invention. It is therefore wished to define the scope of the invention by the appended claims and in view of the specification if need be.

What is claimed is:

1. A dunnage bag for filling a space between two parallel rows of cargo, said dunnage bag comprising:

an air tight inner bag made of a flexible plastic sheet;

a valve means for inflating and deflating said inner bag;

an outer bag made of a woven mesh and enclosing said inner bag;

said outer bag further comprising a single main mesh panel folded to form two broad sides, a bottom side, and a top side with two opposite edges stitched together to form a tube; and said outer bag further comprising a pair of rectangular side mesh panels, each side panel having one edge stitched to an end edge of said tube and an opposite edge stitched to one said end edge to provide that said outer bag be formed having a substantially mattress shape when positioned in said space between said rows of cargo and said inner bag is filled with pressurized air.

2. The dunnage bag of claim 1 wherein said space between rows of cargo is in a range of 12 to 22 inches and said mattress shape has dimensions about 20 inches wide, a height selected from a range between 30 and 48 inches and a length selected from a range between 48 and 102 inches.

3. The dunnage bag of claim 1 wherein said inner bag comprises an extruded high density polyethylene tube with vinyl acetate modification wherein each end of said tube is sealed and whereby said vinyl acetate modification increases elasticity of said inner bag.

4. The dunnage bag of claim 3 wherein said innerbag tube has a wall 0.1 millimeters thick.

5. The dunnage bag of claim 1 wherein said woven mesh comprises woven polypropylene thread about 0.5 millimeters thick with about twelve threads per inch of weave.

* * * * *